United States Patent

Heiland

(10) Patent No.: US 7,715,948 B2
(45) Date of Patent: May 11, 2010

(54) METHOD AND APPARATUS FOR REGULATING VIBRATION ISOLATION SYSTEMS

(75) Inventor: Peter Heiland, Raunheim (DE)

(73) Assignee: Integrated Dynamics Engineering GmbH (DE)

( * ) Notice: Subject to any disclaimer, the term of this patent is extended or adjusted under 35 U.S.C. 154(b) by 124 days.

(21) Appl. No.: 11/692,918

(22) Filed: Mar. 29, 2007

(65) Prior Publication Data

US 2007/0233325 A1    Oct. 4, 2007

(30) Foreign Application Priority Data

Mar. 29, 2006  (EP) .................................. 06006518

(51) Int. Cl.
*G05B 21/00*    (2006.01)
(52) U.S. Cl. .................. 700/280; 700/75; 702/191; 702/194
(58) Field of Classification Search .................. 700/280, 700/75; 701/37, 111; 381/71.2, 71.11, 71.13; 702/56, 54, 190, 191, 193, 194, 195; 73/11.05, 73/570; 720/651, 688, 692; 335/90, 104
See application file for complete search history.

(56) References Cited

U.S. PATENT DOCUMENTS

| | | | |
|---|---|---|---|
| 2,946,943 A | | 7/1960 | Nye et al. |
| 3,705,978 A | | 12/1972 | De Schamphelaere |
| 4,770,438 A | * | 9/1988 | Sugasawa et al. ............. 701/37 |
| 5,551,360 A | * | 9/1996 | Qui ........................ 112/470.01 |
| 6,137,886 A | * | 10/2000 | Shoureshi .................. 381/71.2 |
| 6,553,835 B1 | * | 4/2003 | Hobbs et al. ............. 73/514.16 |
| 2005/0036636 A1 | * | 2/2005 | Noro et al. .................. 381/124 |

FOREIGN PATENT DOCUMENTS

| | | |
|---|---|---|
| EP | 0 074 862 A | 3/1983 |
| FR | 2 692 017 A | 12/1993 |
| GB | 2 000 609 A | 1/1979 |

OTHER PUBLICATIONS

Watters B G et al., "A Perspective on active machinery isolation" Proceedings of the 27th conference on Decision and control, Seiten 2033-2038, XP010071445, Austin, Texas, Dec. 7, 1988.

* cited by examiner

*Primary Examiner*—Charles R Kasenge
(74) *Attorney, Agent, or Firm*—DeMont & Breyer, LLC

(57) ABSTRACT

The invention relates to the control and regulation of a vibration isolation system with a number of vibration signal transducers for providing analogue sensor signals and a number of actuators for suppressing vibrations by processing the sensor signals to form actuator actuation signals for driving the actuators. One object of the invention is to demonstrate a way which enables high-quality parameterizability and regulating performance over a considerably wider frequency bandwidth of a vibration isolation system to be regulated. The invention proposes digitizing some of the sensor signals provided and processing them to form digital actuator actuation signals and processing other sensor signals provided in an analogue manner to form analogue actuator actuation signals and combining the digital actuator actuation signals and the analogue actuator actuation signals to form common actuator actuation signals which are supplied to the actuators in order to drive them.

11 Claims, 1 Drawing Sheet

METHOD AND APPARATUS FOR REGULATING VIBRATION ISOLATION SYSTEMS

Figure 1:
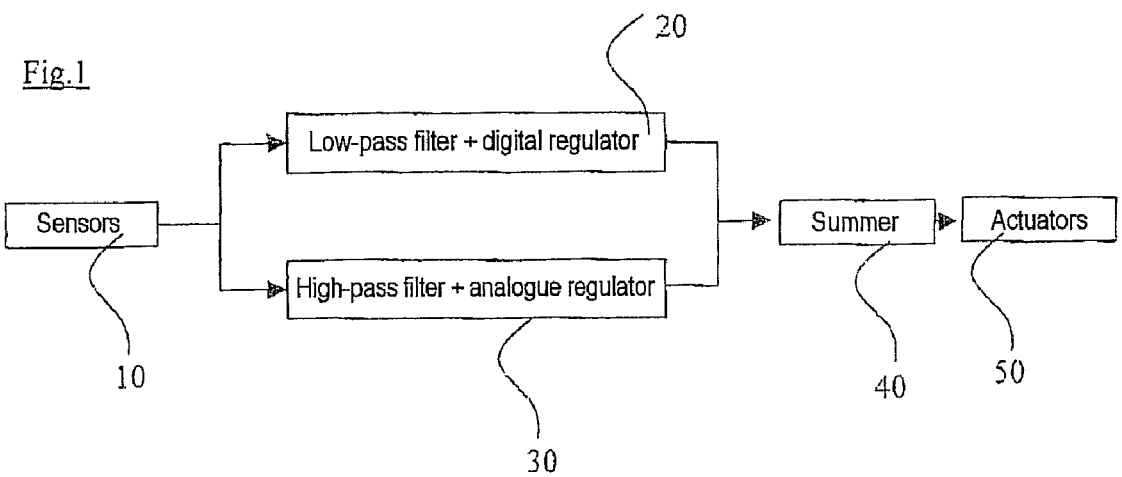

The invention relates to the control and regulation of a vibration isolation system with a number of vibration signal transducers for providing analogue sensor signals and a number of actuators for suppressing vibrations by processing the sensor signals to form actuator actuation signals for driving the actuators.

Regulating apparatuses which carry out the calculations, which are needed to process the sensor signals to form actuator actuation signals, at a digital level are conventionally used to regulate vibration isolation systems. A digital processor which is used in this case for processing usually comprises at least one digital signal processor, a so-called DSP. The connections to the analogue environment, that is to say, in particular, to the vibration signal transducers (generally referred to as the sensor system), of the vibration isolation system and to the actuators, for example motors, of the vibration isolation system for counteracting and consequently for suppressing vibrations detected using the sensor system are established using analogue/digital converters (AD converters) which are connected upstream of the regulating apparatus and digital/analogue converters (DA converters) which are connected downstream of the regulating apparatus.

In this case, the upstream AD converters provide the processor with the analogue sensor signals in digitized form, said processor calculating the regulation paths and first of all providing digital actuator signals on the basis of the latter. The downstream DA converters then ensure that these calculated digital actuator signals are converted into current/voltage signals which are then amplified by an amplifier and supplied to the actuators.

Such digital systems consequently inevitably operate with discrete-time processing in which the analogue signals are sampled (AD converter) in discrete defined intervals and the discrete-time approximations of the processed signals are converted into analogue signals again (DA converter) using stepped approximation. The time between two sampling intervals is available to the processor for processing the regulated variables.

The advantage of a regulating apparatus which operates in a digital manner and is intended to regulate vibration isolation systems resides, in particular, in the simple parameterizability since the regulating parameters are digitally accessible. Therefore, it is possible to intervene extensively in the behaviour of the regulating system.

However, a considerable drawback is that a time delay is introduced between the input and output of the regulated variables on account of the AD and DA conversion, which time delay is equivalent to a phase loss within the regulating system. This phase loss signifies a limiting factor for most regulating systems. A constant time delay signifies a phase loss which increases linearly with the frequency. Therefore, this phase loss limits the frequency bandwidth during regulation. Furthermore, the sampling rate can be increased only to the extent to which all regulating algorithms can be processed within a sampling period. In practice, the complexity of the requisite processing of the regulated variables, together with the computation power of the digital processor, thus also determines the maximum possible sampling rate and thus additionally the shortest possible signal propagation time within the processor.

Methods and apparatuses for restricting vibrations, which occur and need to be suppressed within a vibration isolation system, to a low-frequency range from the outset are known, reference being made to EP 0 927 380 B1 by way of example.

In contrast, if regulating apparatuses which carry out the calculations, which are needed to process the sensor signals to form actuator actuation signals, at an analogue level are used to regulate vibration isolation systems, the phase loss is determined only by the electronic components themselves since it is possible to operate without an additional time delay. In this case, although adjustable electrical components could likewise be used to influence the parameterization of the regulated variables and of the path to be regulated, a regulating apparatus which operates in an analogue manner affords, as a considerable drawback in comparison with a digital variant, very poor user influencing capabilities.

One object of the invention is thus to demonstrate a way which can be used to effectively counteract the drawbacks of the prior art shown above and which enables high-quality parameterizability and regulating performance over a considerably wider frequency bandwidth of a vibration isolation system to be regulated.

The object is achieved according to the invention in an extremely surprising manner by means of a method and an apparatus having the features according to the appended independent claims.

The subclaims relate to advantageous and/or preferred embodiments and developments of the invention.

The invention thus proposes a considerably improved method for regulating a vibration isolation system, in which a number of vibration signal transducers are used to provide analogue sensor signals which represent vibrations, the sensor signals are processed to form actuator actuation signals, and the actuator actuation signals are supplied to actuators in order to drive them for the purpose of counteracting the vibrations. The method is distinguished by the fact that some of the sensor signals provided are digitized and are processed to form digital actuator actuation signals and other sensor signals provided are processed in an analogue manner to form analogue actuator actuation signals, and by the fact that the digital actuator actuation signals and the analogue actuator actuation signals are combined to form common actuator actuation signals which are supplied to the actuators in order to drive them.

A considerable advantage of the invention consequently resides in the practice of combining two different regulating technologies for vibration isolation applications.

On the basis of digital regulation together with analogue regulation in a regulating apparatus of a vibration isolation system, the advantages of the two technologies are expediently and effectively used to enable optimum parameterizability and regulating performance as a whole.

Depending on the application, in order to counteract a phase loss which occurs during digital regulation as the frequency of the sensor signals to be processed increases, a transition frequency at which the process changes from digital processing of the sensor signals to analogue processing of the sensor signals is expediently determined for the sensor signals. The regulating tasks are thus divided according to frequency range.

In order to avoid over-assessment in a range in which the frequency ranges may possibly overlap, which would result in inadequate actuator actuation signals and consequently in the actuators being driven incorrectly, the contributions of the respective processing are preferably weighted at least in one transition range in which the sensor signals are processed in a digital and analogue manner.

In practical implementation, the contributions of the respective processing are weighted using frequency-dependent filtering of the sensor signals.

The invention also provides for the digital actuator actuation signals and the analogue actuator actuation signals to be combined, for the digital actuator actuation signals to first of all be converted to analogue form again and to then be summed with the analogue actuator actuation signals.

In order to carry out the inventive method, the invention also proposes a regulating apparatus of a vibration isolation system, said apparatus being designed to process analogue sensor signals, which are provided by a number of vibration signal transducers of the vibration isolation system, to form actuator actuation signals which are supplied to actuators of the vibration isolation system in order to drive them. The regulating apparatus comprises a regulating device which operates in a digital manner and is intended to process sensor signals to form digital actuator actuation signals and a regulating device which operates in an analogue manner and is intended to process sensor signals to form analogue actuator actuation signals as well as an input circuit which is coupled to the inputs of the two regulating devices and is intended to supply sensor signals to the regulating device which operates in a digital manner and to the regulating device which operates in an analogue manner, and an output circuit which is coupled to the outputs of the two regulating devices and is intended to combine digital actuator actuation signals from the regulating device which operates in a digital manner and analogue actuator actuation signals from the regulating device which operates in an analogue manner to form common actuator actuation signals for driving the actuators.

In a practical development, the regulating apparatus also comprises a frequency separation device for separating the sensor signals into at least two frequency bands, the regulating device which operates in a digital manner processing sensor signals within a first frequency band to form digital actuator actuation signals and the regulating device which operates in an analogue manner processing sensor signals within a second frequency band to form analogue actuator actuation signals.

According to preferred developments, the frequency separation device is part of at least one of the regulating devices and/or part of the input circuit. The sensor signals are thus applied to the inputs of both subsystems or regulating devices, the frequencies being able to be separated even upstream of the regulating devices or within the regulating device.

In particular, provision is made for the frequency separation device to be in the form of a frequency filter and/or to comprise frequency-selecting filters on an application-specific basis.

According to practical embodiments, the frequency separation device comprises a low-pass filter for selecting actuation signals which are to be processed in a digital manner and a high-pass filter for selecting actuation signals which are to be processed in an analogue manner.

Such a low-pass filter in turn preferably comprises, on an application-specific basis, a digital low-pass filter or an analogue low-pass filter with a downstream AD converter.

In order to combine digital actuator actuation signals from the regulating device which operates in a digital manner and analogue actuator actuation signals from the regulating device which operates in an analogue manner to form common actuator actuation signals in order to drive the actuators, the regulating apparatus comprises, according to an advantageous embodiment which is particularly simple to implement, a DA converter which is coupled for the purpose of converting the digital actuator actuation signals into analogue signals.

These converted analogue signals and the analogue actuator actuation signals from the analogue regulating device can thus be combined in an analogue manner and, after they have been combined, can be supplied to the actuators in a correspondingly analogue manner in order to drive the latter.

In particular, provision is made of an analogue summing device for combining the output signals from the DA converter and the analogue actuator actuation signals from the analogue regulating device.

The regulating apparatus also comprises, on an application-specific basis, an amplifier device for amplifying the common actuator actuation signals before driving the actuators.

In summary, the invention is thus based on the practice of combining two different technologies and consequently provides a type of hybrid regulation. In order to counteract a phase loss during digital regulation as the frequency increases, the regulating tasks are divided on the basis of the frequency range. Depending on the application and the phase loss, a transition frequency at which the regulating system changes from digital regulation to analogue regulation is determined. Since digital regulation suffers from the phase loss as the frequency increases, it is expediently used only in a lower frequency range, whereas analogue regulation is used in an upper frequency range. The sensor inputs are, in principle, equally available to both subsystems, the frequencies of the sensor signals being able to be separated even before the signals are introduced into the respective regulating device but this does not necessarily have to be the case. One of the regulating devices digitizes the sensor signals and the other uses the respective analogue signal directly. The output signals calculated by the two regulating subunits are summed in an analogue manner and thus form common actuator actuation signals, which cover the entire frequency range, at the output of the complete regulating apparatus.

Figure 2:
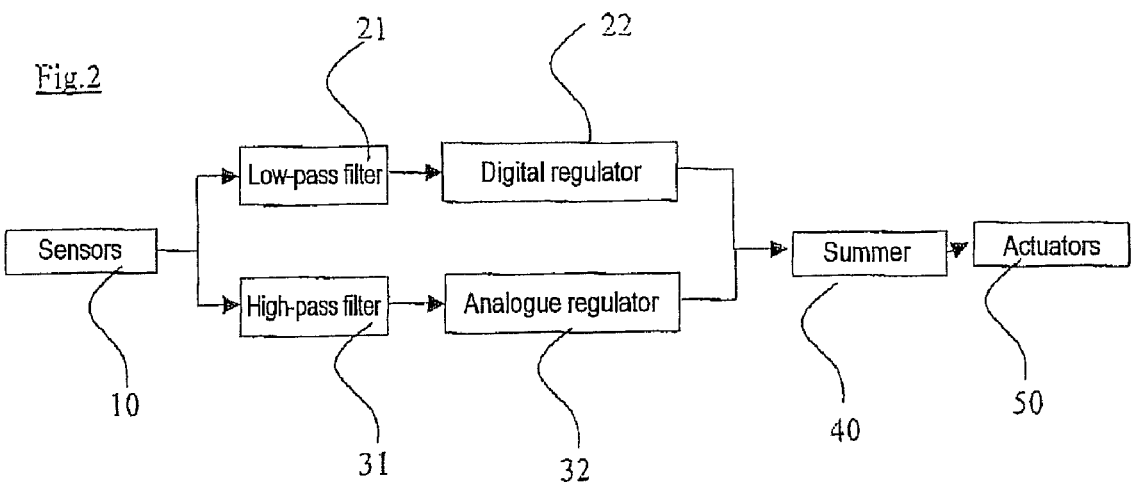
Figure 3:
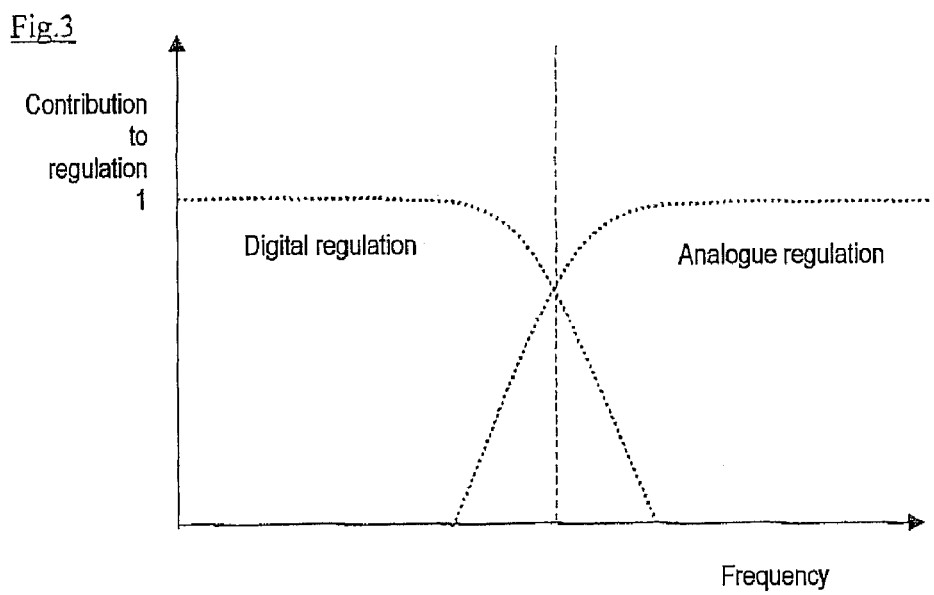

Further advantages and features of the invention become apparent from the following description of two preferred exemplary embodiments with reference to the accompanying drawings, in which:

FIG. 1 shows, in a highly simplified manner, an inventive regulating system, the frequency ranges being divided within the regulating subunits, FIG. 2 shows another highly simplified inventive regulating system in which the frequency ranges are divided outside the regulating subunits, and FIG. 3 shows a diagrammatic illustration of an exemplary contribution to regulation as a result of frequency division for the two regulating subunits.

Reference will be made below to the exemplary embodiments of the invention which are illustrated in the figures.

The regulating apparatuses for active vibration isolation system applications, which are illustrated in a highly simplified manner in FIGS. 1 and 2, can, in principle, be constructed using electronic components which are known per se. As can be seen in FIGS. 1 and 2, a number of sensors 10, in the form of vibration signal transducers for providing analogue sensor signals, are connected to the inputs of two regulation paths which are routed in a parallel manner and are intended to process the sensor signals to form actuator actuation signals. The outputs of the regulation paths are connected to a number of actuators 50, with the result that the actuators can be driven to counteract the detected vibrations by supplying the actuator actuation signals.

For the inventive implementation, the regulating apparatus comprises a frequency separation device which ensures that the frequencies are separated for the two regulating subunits 20 and 30 or 21 and 31 of the regulation paths.

As shown in FIG. 1, this can take place, for example, in the subunits themselves. In this case, one regulation path comprises a digital regulating device 20 which, in addition to the actual digital regulator, also has a low-pass filter which trims the signals. In the example illustrated, the low-pass filter is a digital low-pass filter. The other regulation path comprises an analogue regulating device 30 which, in addition to the actual analogue regulator, also has a high-pass filter which effects the desired frequency separation. In the example illustrated, the high-pass filter is an analogue high-pass filter.

As shown in FIG. 2, the frequencies are separated at the sensor end or in an input circuit which is connected upstream of the regulating devices. As shown in FIG. 2, the frequencies are separated by using a frequency filter, which comprises a low-pass filter 21 and a high-pass filter 31, to divide the analogue sensor signals into two frequency bands, the lower frequency band of which, which is provided by the low-pass filter 21, is supplied to the digital regulator of the digital regulating device 22 and the upper frequency band of which, which is provided by the high-pass filter 31, is supplied to the analogue regulator of the analogue regulating device 32.

It is apparent to a person skilled in the art that, depending on the application, the frequencies are separated in a more expedient manner such that the signals are not over-assessed in a range in which the frequency bands overlap, as can be seen in FIG. 3. This can be ensured in a simple manner just by means of appropriate selection, adjustment and/or configuration of the high-pass filters and low-pass filters. The transition frequency, which can be seen in FIG. 3 and around which the overlapping range forms, may be, for example, at a frequency of approximately 20 Hz to approximately 70 Hz. However, the transition frequency may, if appropriate, vary greatly depending on the application and phase loss of the digital regulator used. Only digital regulation essentially contributes to regulation of the vibration isolation system below the overlapping range, whereas only analogue regulation essentially contributes to regulation of the vibration isolation system above the overlapping range.

In the case of the two embodiments shown in FIGS. 1 and 2, the digital actuator actuation signals, which first of all form the output signal from the digital regulating device 20 or 22, are converted back into an analogue signal using a DA converter (not illustrated) and are then supplied to an analogue summer 40 which adds them to the output signal from the analogue regulating device 30 or 32, said output signal comprising the analogue actuator actuation signals. This summed overall output signal can then be supplied to an amplifier (not illustrated) in order to then drive one or more actuators 50.

In one practical implementation, the vibration signal transducers or sensors 10 are arranged, in a particular manner matched to the intended application, around a mass (not shown in the figures) to be isolated, also expediently in terms of their directional sensitivity. The actuators 50 are likewise arranged in a suitable manner with respect to the mass in order to support the latter and isolate the vibration of the mass from the environment or to counteract such vibrations. Furthermore, six degrees of freedom generally need to be observed in vibration isolation systems, the vibrations within the six degrees of freedom being picked up using the number of sensors. For example, six sensors are provided, one for each degree of freedom. The sensor signals provided are usually coupled to one another such that the regulating devices first of all process the sensor signals to form decoupled axis signals which are then also processed further in order to generate actuation signals at the actuator. If, for example, eight actuators are provided, eight actuator actuation signals are also correspondingly calculated for each regulating device, the summed overall output signal also comprising a corresponding number of actuation signals for driving the actuators 50.

The inventive regulating apparatus and the inventive regulating method for vibration isolation applications thus provide hybrid regulation which comprises both digital regulation and analogue regulation. The advantages of both technologies are expediently used to enable optimum parameterizability and regulating performance as a whole. Good parameterizability is thus achieved, in particular, through the use of a digital signal processor and (software) adjustable parameters. For further improvement, parameters of the analogue regulating subunit are expediently also (software) adjustable. A minimum phase loss in the higher frequency range is effectively supported by using analogue regulation.

Both regulating devices, the digital regulating device and the analogue regulating device, can consequently each be designed to process sensor signals within a particular frequency range in an optimum manner.

The invention claimed is:

1. A regulating apparatus of a vibration isolation system with one or more vibration signal transducers (10) that are for providing sensor signals in analogue form and one or more actuators (50) which are intended to suppress vibrations and can be driven by supplying actuator actuation signals, the regulating apparatus being designed to process the sensor signals to form such actuator actuation signals, the regulating apparatus comprising:

a first regulating device (20, 22) which operates in a digital manner, for providing digital processing of a first portion of the sensor signals to form digital actuator actuation signals;

a second regulating device (30, 32) which operates in an analogue manner, for providing analogue processing of a second portion of the sensor signals to form analogue actuator actuation signals, wherein processing of the sensor signals is divided across the digital processing and the analogue processing according to frequency range;

an input circuit which is coupled to inputs of the first and second regulating devices, wherein the input circuit is for supplying the sensor signals to the first regulating device and the second regulating device; and an output circuit (40) which is coupled to outputs of the first and second regulating devices, wherein the output circuit is for combining the digital actuator actuation signals from the first regulating device and the analogue actuator actuation signals from the second regulating device, to form common actuator actuation signals for driving the one or more actuators;

wherein the contribution of the digital processing and the contribution of the analogue processing, in forming the common actuator actuation signals, are weighted at least in one transition range of frequency, in which the sensor signals are processed in both a digital and analogue manner.

2. A regulating apparatus according to claim 1, also comprising a frequency separation device (21, 31) for separating the sensor signals into at least two frequency bands, the first regulating device processing sensor signals within a first frequency band to form the digital actuator actuation signals and the second regulating device processing sensor signals within a second frequency band to form the analogue actuator actuation signals.

3. A regulating apparatus according to claim 2, the frequency separation device being i) part of at least one of the first and second regulating devices or ii) part of the input circuit, or both.

4. A regulating apparatus according to claim 2, the frequency separation device i) being in the form of a frequency filter or ii) comprising frequency-selecting filters, or both.

5. A regulating apparatus according to claim 2, the frequency separation device comprising a low-pass filter for selecting sensor signals which are to be processed in a digital manner and a high-pass filter for selecting sensor signals which are to be processed in an analogue manner.

6. A regulating apparatus according to claim 5, the low-pass filter comprising a digital low-pass filter or an analogue low-pass filter with a downstream A/D converter.

7. A regulating apparatus according to claim 1, comprising an amplifier device for amplifying the common actuator actuation signals before driving the one or more actuators (50).

8. A regulating apparatus according to claim 1, wherein the output circuit comprises a D/A converter which is coupled to the first regulating device, for converting the digital actuator actuation signals into analogue output signals.

9. A regulating apparatus according to claim 8, wherein the output circuit further comprises a summing device for combining i) the analogue output signals from the D/A converter and ii) the analogue actuator actuation signals from the second regulating device.

10. A method for regulating a vibration isolation system, the method comprising:
   providing sensor signals in analogue form, via one or more vibration signal transducers, the sensor signals representing vibrations;
   dividing, into digital processing and analogue processing, the regulating of the vibration isolation system according to frequency range;
   digitizing and processing a first portion of the sensor signals provided, thereby performing the digital processing to form digital actuator actuation signals;
   processing, in an analogue manner, a second portion of the sensor signals provided, thereby performing the analogue processing to form analogue actuator actuation signals; and
   combining the digital actuator actuation signals and the analogue actuator actuation signals to form common actuator actuation signals, by i) converting the digital actuator signals to analogue form and ii) summing the converted digital actuator signals with the analogue actuation signals; and
   supplying the common actuator actuation signals to actuators in order to drive them, thereby counteracting the vibrations;
   wherein a transition frequency at which processing chances from the digital processing of the sensor signals to the analogue processing of the sensor signals is determined for the sensor signals; and
   wherein the contribution of the digital processing and the contribution of the analogue processing, in forming the common actuator actuation signals, are weighted at least in one transition range of frequency, in which the sensor signals are processed in both a digital and analogue manner.

11. A method according to claim 10, wherein the contribution of the digital processing and the contribution of the analogue processing, in forming the common actuator actuation signals, are weighted using frequency-dependent filtering of the sensor signals.

* * * * *